Oct. 21, 1941.                I. GURWICK                2,259,886
              METHOD OF FORMING CONTAINERS AND MATERIAL THEREFOR
                            Filed March 20, 1939
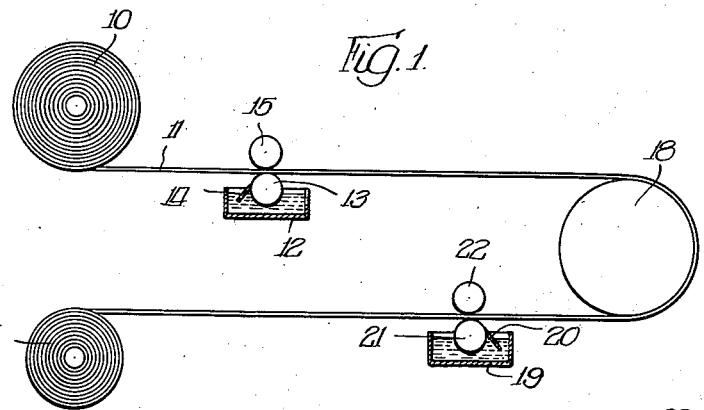
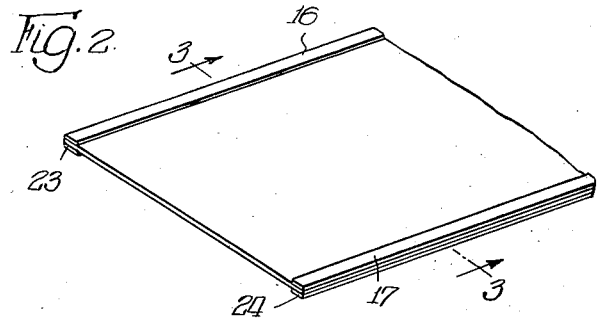
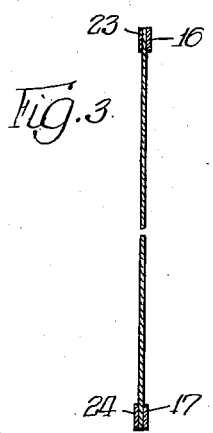
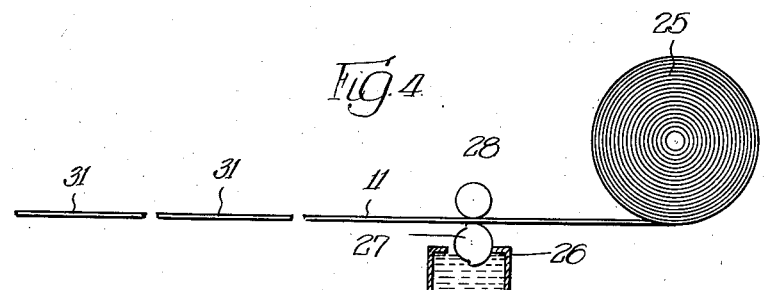
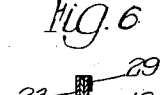
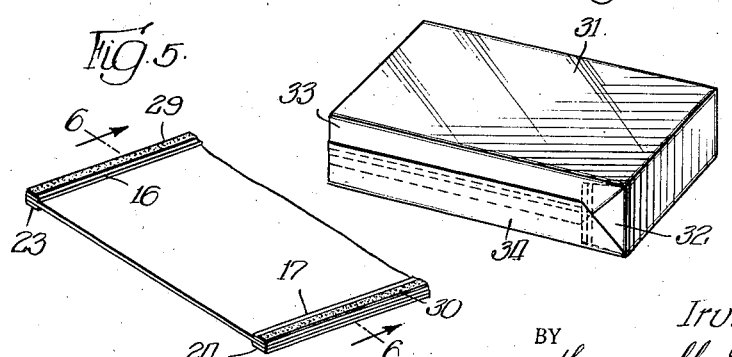
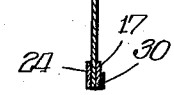
INVENTOR.
Irving Gurwick,
BY Cromwell, Greist & Warden
ATTORNEYS.

Patented Oct. 21, 1941

2,259,886

UNITED STATES PATENT OFFICE 2,259,886

METHOD OF FORMING CONTAINERS AND MATERIAL THEREFOR

Irving Gurwick, Mount Vernon, Ohio, assignor to Shellmar Products Company, Mount Vernon, Ohio, a corporation of Delaware Application March 20, 1939, Serial No. 262,939

4 Claims. (Cl. 93—35)

The present invention relates to the formation of containers from non-fibrous materials such as the product known as Cellophane, and has particular reference to an improved transparent non-fibrous container material.

Within the last decade it has become quite common in the packaging industry to employ transparent materials such as regenerated cellulose in the formation of containers. In Gilfillan Patent No. 2,100,739 is described a method of forming containers which has met with great favor in the industry. This method includes the steps of folding a blank of Cellophane about a hollow mandrel, there initially having been applied along the edges of the Cellophane lines of a thermoplastic adhesive. The container is thermoplastically sealed about the hollow mandrel and then removed, preferably after loading the container through the mandrel. An objection to this method of producing containers is the fact that particularly in cold weather the edges along which the thermoplastic material is applied and the overlapped portions of the wrapper are sealed together tend to break apart. While the initial anchorage of the container is adequate, the thermoplastic adhesive seems to lose some of its bond in a low temperature.

A principal object of the present invention is the provision of improved containers of the type described in the Gilfillan patent.

An additional object of the invention is to provide a new way of forming containers from transparent non-fibrous materials such as regenerated cellulose, in which a seal is provided between overlapped edges of the material, the seal being produced from a thermoplastic adhesive and being so anchored to the regenerated cellulose as to be permanent even in cold weather.

Still another object of the invention is the production of containers from regenerated cellulose by initially depositing along edge portions only of a sheet of regenerated cellulose lines of lacquer which are dried and subsequently depositing upon the lines of lacquer on one side of the sheet a thermoplastic adhesive which are employed to seal a container.

These and other objects of the invention will be understood upon a consideration of the following specification and by reference to the accompanying drawing, in which Fig. 1 is a somewhat diagrammatic view illustrating the method of forming container material;

Fig. 2 is a fragmentary view of the container web formed as shown in Fig. 1;

Fig. 3 is a sectional view taken along line 3—3 of Fig. 2;

Fig. 4 is a partially diagrammatic view illustrating a second step in the formation of the container material;

Fig. 5 is a fragmentary view corresponding to Fig. 2 and showing the container material after it passes through the steps indicated in Fig. 4;

Fig. 6 is a sectional view taken along line 6—6 of Fig. 5; and

Fig. 7 is a perspective view showing a container formed from the improved material.

In accordance with the present invention an improved container material is formed from a roll of regenerated cellulose indicated at 10 in Fig. 1. The web 11 is taken from this roll and passed through an intaglio unit having a bath 12 in which rotates the etched cylinder 13. A conventional doctor blade 14 removes excess material from the roll 13. An impression cylinder 15 is mounted above the etched cylinder 13 and coacts with the latter to effect a deposit along the edge portions only of the web 11. This deposit is indicated by the lines 16 and 17 in Fig. 2. These lines or bands consist of a lacquer material containing a cellulose derivative. This derivative, together with plasticizers and preferably a gum or resin, is contained in a suitable solvent in the bath 12.

A typical formula for the lacquer line includes 8.24 parts of cellulose nitrate of the one-half second type, 12.58 parts of a Bakelite resin, 3.14 parts of tricresyl phosphate, 37.35 parts of methyl acetone, 6.93 parts of ethyl acetate, 6.15 parts of ethyl alcohol, and 25.62 parts of toluol. It will be understood that other combinations of cellulose derivative, resin and plasticizer may be employed.

After application of the lines 16 and 17 on the under side of the web 11 the web is passed about a heated drum 18 which dries the solvent, thereby leaving the lines 16 and 17 in a dry condition, firmly adhering to the edges of the regenerated cellulose.

Thereafter the web 11 is passed through a second intaglio unit having a bath 19 in which is contained the solution of lacquer used in the first color unit, a conventional doctor blade 20 acting to remove excess lacquer from the etched cylinder 21 which deposits additional marginal lines along the edges of the other side of the regenerated cellulose, an impression cylinder 22 backing up the printing cylinder during this operation. The lines 23 and 24 deposited by the second intaglio unit also are marginal lines and are oppositely positioned with respect to the lines 16 and 17. The relation of these various lines is adequately shown in Fig. 3. In depositing the lines of lacquer on opposite sides of the web of Cellophane in the manner described, the units act in the manner of a perfection press.

The web 11, after deposition of the lines of lacquer on opposite sides, is wound into a roll as indicated at 25. The web 11 then is taken from the roll 25 and passed through a thermoplastic adhesive applying device including the tank 26, glue roll 27 and backup roll 28. The glue-applying device contains a thermoplastic adhesive and applies lines of this thermoplastic adhesive as indicated at 29 and 30 along the lines 16 and 17 of lacquer. It will be noted that the lines of thermoplastic adhesive are applied on the lines 16 and 17, but that the adhesive is applied to one side only of the web. The thermoplastic adhesive preferably is applied in hot form and allowed to harden or set up immediately thereafter. Container blanks 31 are cut from the web 11 after application of the thermoplastic adhesive and employed in the formation of containers in the manner described in the Gilfillan patent, one container of this type being indicated in Fig. 7.

In forming the container shown in Fig. 7 the central part of the container blank 31 is folded about the end of a mandrel which is of less width than the width of the blank. The end section 32 then is folded against the side of the mandrel. Thereafter the side section 33 is folded down against the side of the mandrel in overlapping relation with respect to the end section 32. The side section 33 then has the lines 16 and 29 exposed. Side section 34 is folded over on top of the section 33 so that the line 23 covers the line 16 and the adhesive 29. When in this overlapped relation heat and pressure are applied to seal the parts together. The line 29 of thermoplastic adhesive is applied by the sectional wheel 27 so as to extend slightly more than half the length of the container blanks 31. That is, the line 29 is of about the same length as the length of the section 33 and the width of the section 32. The method of forming the container is adequately described in the Gilfillan patent.

I find that when the container is produced in the manner described the sealed edges will remain adhered together even in severe weather conditions. When the container is loaded it may be stored for extensive periods without danger of the seam parting. This is distinguished from ordinary use in which the seams have a definite tendency toward parting. For some reason, the cellulose derivative which is employed in the lines which initially are applied to the edges of the Cellophane causes a very firm union between the thermoplastic adhesive and the Cellophane itself. The container need not have the precise form shown in Fig. 7, but may be any of a number of well known constructions.

It will be recognized that many changes may be made in the method and container material without departing from the scope of the invention as defined in the appended claims.

I claim:

1. The method of forming containers, which comprises depositing on both sides of a sheet of transparent regenerated cellulose marginal lines of a lacquer, depositing on the marginal lines of lacquer on one side of the sheet lines of a thermoplastic adhesive, folding the sheet into container form with the lines of thermoplastic adhesive in overlapping relation with respect to the lines of lacquer on the opposite side of said sheet, and applying heat and pressure thereto.

2. A container, comprising a sheet of regenerated cellulose having marginal lines of a lacquer applied thereto, said sheet being folded into container formation with said lines of lacquer in overlapped relation, and a thermoplastic adhesive securing the overlapped portions together.

3. A container, comprising a sheet of non-fibrous cellulose material, said sheet being folded into container formation with adjacent edge portions, marginal lines of a lacquer on said edge portions in overlapped relation, and a thermoplastic adhesive securing said lines of lacquer together.

4. A container, comprising a sheet of transparent cellulose material having marginal lines of a lacquer on both sides thereof, said sheet being folded into container formation with continuous front, rear and side walls, the side extensions of said walls being folded over in overlapped relation with said lines of lacquer in adjacent relation, and a thermoplastic adhesive securing said lines together.

IRVING GURWICK.